(12) United States Patent
Muegge

(10) Patent No.: US 11,760,253 B2
(45) Date of Patent: Sep. 19, 2023

(54) LIGHTING DEVICE FOR A MOTOR VEHICLE

(71) Applicant: HELLA GmbH & Co. KGaA, Lippstadt (DE)

(72) Inventor: Martin Muegge, Geseke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/987,466

(22) Filed: Nov. 15, 2022

(65) Prior Publication Data

US 2023/0150417 A1 May 18, 2023

(30) Foreign Application Priority Data

Nov. 15, 2021 (DE) ...................... 10 2021 129 659.5

(51) Int. Cl.
| | |
|---|---|
| *B60Q 1/00* | (2006.01) |
| *B60Q 1/26* | (2006.01) |
| *F21S 43/14* | (2018.01) |
| *F21S 43/31* | (2018.01) |
| *F21S 43/19* | (2018.01) |
| *F21S 43/20* | (2018.01) |
| *F21S 43/15* | (2018.01) |

(52) U.S. Cl.
CPC ......... *B60Q 1/0041* (2013.01); *B60Q 1/2607* (2013.01); *F21S 43/14* (2018.01); *F21S 43/15* (2018.01); *F21S 43/19* (2018.01); *F21S 43/26* (2018.01); *F21S 43/31* (2018.01)

(58) Field of Classification Search
CPC ....... B60Q 1/26; B60Q 1/2607; B60Q 1/2619
See application file for complete search history.

(56) References Cited

U.S. PATENT DOCUMENTS

| | | | |
|---|---|---|---|
| 5,819,454 A | 10/1998 | Rosenitsch | |
| 8,950,884 B2* | 2/2015 | Stevens | G02F 1/133605 362/97.3 |
| 10,112,528 B1* | 10/2018 | Mazuir | B60Q 1/549 |
| 2007/0008734 A1* | 1/2007 | Bogner | F21S 41/28 257/E33.071 |
| 2018/0312102 A1* | 11/2018 | Park | F21S 43/50 |
| 2019/0310516 A1* | 10/2019 | Kyoukane | G02F 1/133603 |
| 2021/0364145 A1* | 11/2021 | Lee | B60Q 1/0035 |

FOREIGN PATENT DOCUMENTS

DE 102016119326 A1 4/2018

\* cited by examiner

*Primary Examiner* — Eric T Eide
(74) *Attorney, Agent, or Firm* — Muncy, Geissler, Olds & Lowe, P.C.

(57) ABSTRACT

A lighting device for a motor vehicle, wherein the lighting device comprises a printed circuit board having a plurality of light-emitting diodes arranged thereon, an optical disk and a reflector element, wherein the reflector element is arranged between the circuit board and the optical disk, wherein the reflector element has a plurality of segments into which the reflector element is divided, wherein each light-emitting diode is assigned a segment so that light emitted from the LEDs is reflected at the reflector element and passes through the optical disk.

17 Claims, 19 Drawing Sheets

LIGHTING DEVICE FOR A MOTOR VEHICLE

This nonprovisional application claims priority under 35 U.S.C. § 119(a) to German Patent Application No. 10 2021 129 659.5, which was filed in Germany on Nov. 15, 2021, and which is herein incorporated by reference.

BACKGROUND OF THE INVENTION

Field of the Invention

The present invention relates to the design of a pixelated or segmented functional surface of a luminaire or lighting device on a motor vehicle serves to define and provide a desired light signature by different, individual switching of individual segments/pixels or to display additional information content (e.g., numbers, text, pictograms). This means that new content or light signatures can be developed over the service life of the motor vehicle and offered to the vehicle owner/driver without having to develop a new luminaire each time.

Description of the Background Art

A corresponding lighting device is known from DE 10 2016 119 326 A1.

From the general prior art, LED displays with a matrix arrangement of RGB LEDs are known, which are mainly known from advertising or as video walls at trade fairs and concerts. The RGB LEDs have very weak luminous flux, which is why the legally required luminous intensity cannot be achieved with a correspondingly limited number of LEDs with these LED displays in the automotive sector. In addition, such LED displays are controlled via video interfaces, e.g., HDMI, which are not used in automobiles, since such video signals are not suitable for controlling lights and functions. Another disadvantage of these LED panels is the pixelated arrangement of light-emitting diodes in a matrix. The viewer sees a bright point at each LED point and an observer can only recognize a sharp image through the very narrow distances and a correspondingly high resolution even from close viewing distances. For this reason, distances between adjacent light-emitting diodes of less than 2 mm or distances are already provided, or distances of 1 mm or less are targeted, for such LED panels.

In order to generate the legally required minimum light levels of 4 cd for a red taillight, 50 cd (ECE) or 130 cd (SAE) for a yellow direction indicator and 60 cd (ECE) or 80 cd (SAE) for a red brake light in automotive use, LEDs with higher operating currents and luminous fluxes, as well as with an automotive specification, must be used and optical systems that make optimal use of the luminous flux of the LED, so that a brake light or direction indicator can be generated even with a small number of pixels/segments and different light signatures can be developed and approved with the existing segmented matrix display surface.

SUMMARY OF THE INVENTION

It is therefore an object of the present invention to provide an improved lighting device as compared to the prior art, in particular with a high degree of freedom in the design of the display of light signatures while at the same time being cost-effective and having a compact design.

In an exemplary embodiment, the object is achieved by a lighting device and a motor vehicle. Features and details disclosed in connection with the lighting device according to the invention apply, of course, also in connection with the lighting system according to the invention and with the motor vehicle according to the invention and vice versa, so that with regard to the disclosure, the individual aspects of the invention are or can always be reciprocally referenced.

According to a first aspect of the invention, the above object is achieved by a lighting device for a motor vehicle, wherein the lighting device is configured in particular for light signature displays or for displaying light signatures. The lighting device has a printed circuit board with a plurality of light-emitting diodes arranged on it, an optical disk and a reflector element. The reflector element is arranged between the printed circuit board and the optical disk. The reflector element (and optionally the optical disk) has a plurality of segments into which the reflector element (and optionally the optical disk) is divided, wherein each light-emitting diode is assigned a segment, so that light emitted from the LEDs is reflected on the one hand at the segments of the reflector elements and on the other hand passes through the optics disk (in particular segments). The segments have a triangular or substantially triangular shape.

In particular, the optics of the segments of the optical disk can dive deep into the segments of the reflector in order to generate a coordinated light guidance and homogeneity of the illumination and a flat structure.

According to the invention, the use of (substantially) triangular segments is thus proposed, which reflect light from the light-emitting diode instead of using rectangular segments known from the prior art. It has been found that the formation of the reflector element with the triangular segments shows an advantageous arrangement in the lighting device, which allows for a very precise display of different light signatures with a comparatively small number of segments.

The triangular shape refers in particular to the cross-section of the segment or the shape is visible in the plan view of the segment on the reflector element. Accordingly, areas on the optical disk can be illuminated that assume a corresponding shape of the segments, i.e., a triangular luminous form. As a result, many different light signatures that are relevant especially for traffic and otherwise, can be displayed by illuminating the triangular segments by means of the lighting device. In the case of the triangular segments, a particularly high degree of control for different light signatures is possible.

Substantially triangular includes shapes that can be roughly understood as triangular, even if they are not mathematically exactly triangular. For example, a triangular shape with rounded corners is also understood as substantially triangular.

Since the segments are triangular, each segment has in particular three reflector surfaces or reflector walls, which are connected to each other on their sides. In their center, the segments can each have two openings. An opening is close to the light-emitting diode assigned to the segment in order to allow the light of the light-emitting diode to shine in. The other opening is close to the optical disk or away from the LED to allow for the light reflected on the reflector surfaces of the segments of the reflector element to radiate onto the optical disk. The opening close to the light-emitting diode is, in particular, smaller than the opening which is close to the optical disk. Accordingly, tapering or converging segments may be provided in particular in the direction from the optical disk to the light-emitting diodes. The segments can thus also be described with regard to their body or volume as funnel-shaped or pyramid-shaped with corresponding openings at the top and bottom of the pyramid shape.

The fact that the lighting device is designed for a motor vehicle means in particular that the lighting device is suitable for use in a motor vehicle. Nevertheless, other areas of application of the lighting device according to the invention are conceivable and possible. However, the field of application of motor vehicles is particularly preferred. Thus, in particular the lighting device can be a motor vehicle lighting device. For example, the lighting device may be a rear light, an auxiliary light, a headlight or the like.

Several segments may each be combined into a repeating arrangement of rows and columns on the reflector element. The repeating arrangements of the segments with their respective shapes allow for a particularly versatile design and display of different light signatures.

In particular, the arrangements may each have a rectangular, in particular square, shape. Four triangular segments can be combined into a rectangular shape. Accordingly, the light-emitting diodes on the circuit board may be arranged correspondingly. Thus, the circuit board may have a repeating pattern of an arrangement of four light-emitting diodes each. The arrangement can be described, for example, as a plus or + arrangement in which four light-emitting diodes can be connected to each other by two imaginary lines, each connecting and intersecting two light-emitting diodes horizontally and vertically.

It may also be provided that each light-emitting diode is assigned a segment in such a way that light emitted from each light-emitting diode is reflected at the reflector element (or respective segment of the reflector element) and passes through the optical disk in the region of the segment assigned to the respective light-emitting diode. The assignment of the segments to the LEDs can be made by corresponding relative arrangement to each other. Thus, each segment of a reflector element can surround a light-emitting diode on the circuit board, in particular envelop or enclose it. This causes the reflection of the light of the respective light-emitting diode on the reflector element in the area of the respective segment.

Each segment of the reflector element can be assigned a concave lens, which may be arranged between the reflector element and the optical disk. In particular, the lenses may be arranged, in particular formed, on the optical disk, in particular on the inside of the optical disk or the side opposite the reflector element. Assignment means in particular that in each case one lens is located opposite a segment. The lenses may be formed in particular as one piece with the optical disk. In particular, the lenses may have the same segmentation as the reflector element. It is also possible that the lenses have a triangular or substantially triangular shape to correspond to the segments. A concave, central surface of the lens can have on the one hand a larger distance (several millimeters) to the light-emitting diode assigned to it by means of the segment. Due to their shape, especially as pyramidal optics, the lenses can have a larger wall thickness in their outer area. This is advantageous for uniform illumination without emphasizing an axial light diode intensity (especially with so-called top LEDs) and thus enables illumination of the segment or the area of the optical disk in front of the segment without a hotspot. At the same time, the optical disk also includes a light guide effect and, in the interaction of the prism surfaces of the lens and the surrounding reflector surfaces of the segments of the reflector element, also an additional light guidance, which together with the central illumination of the concave lens surface leads to a homogeneous illumination of the segment or the area of the optical disk in front of the segment, thus providing high performance.

It is also possible additionally or alternatively that radially radiating light-emitting diodes are used. Despite the radial emission of light from the light-emitting diodes, the reflector element redirects the light emitted by the radially radiating light-emitting diodes in the forward direction, i.e., onto the optical disk. Accordingly, the reflector element can specifically be designed to deflect the radially emitted light from each of the light-emitting diodes in the forward direction to the optical disk. As a result, a particularly uniform illumination of each area of a segment or the optical disk in the area of the segments can be achieved, so that uniform illumination of the optical disk or segments can be achieved. In the case of the used light-emitting diodes of the type of radial light emission it is advantageous that the path of the light to the reflector element or the wall elements there is comparatively short. As a result, a comparatively compact lighting device for a motor vehicle can be provided. In particular, the lighting device can be formed with a comparatively small thickness, in particular measured from the circuit board to the optical disk. In particular, the radially radiating light-emitting diodes can be configured to radiate light radially outwards at or from their circumference. At least not only or not predominantly, light can be emitted from each of the light-emitting diodes from a front side, as is the case, for example, with a top LED. However, it is crucial that light is also (in particular predominantly) radiated radially or ring-shaped from the circumference of the light-emitting diodes. The circumference of a light-emitting diode is understood to mean the sides of the light-emitting diode, which typically extend obliquely, in particular orthogonally, with regard to the front. In other words, the circumference with its side or sides is located between the front and back of the LED. In particular, radially radiating light-emitting diodes may be designed to radially radiate light outwards over at least more than half of their circumference or substantially along their entire circumference. In other words, light may be radiated radially outwards along at least half a portion, a predominant portion, or substantially the whole of the circumference, or, in other words, radiated in a ring form by each of the light-emitting diodes.

The design of the optical disk with the concave lenses and/or the choice of radially radiating light-emitting diodes in combination with the light-emitting diode light distribution and the reflector element leads to uniform illumination of the segments or segment surfaces of the reflector element and thus the optical disk. This provides a segment display function and at the same time a high lighting performance, since almost all the light of the respective LEDs are used. Thus, the lighting device can already provide high intensities even with relatively low-light LEDs and realize functions such as taillights, brake lights, direction indicators or daytime running lights, especially when several lighting devices are used in the context of a lighting system for switching a continuous or common light signature.

It is also possible that the segments of the reflector element have an at least partial striped effect or a striped effect is formed in the segments. In this case, a striped effect may be provided on each surface or reflector wall of the segment or the reflector element. The striped effect, which can also be referred to as a ripple effect, can scatter the direct surface reflection of the light-emitting diode light and thus counteract a concentrated imaging of the light in the illumination in order to avoid hotspots.

Moreover, it may be provided that a distance between the light-emitting diodes and the optical disk is less than 15 mm, most preferably less than 12 mm, further most preferably less than 10 mm and particularly preferably less than 8 mm. As a lower limit, the distance may be, for example, at least 2 mm, most preferably at least 4 mm and further most preferably at least 6 mm. Accordingly, a particularly compact lighting device is provided, which has a particularly small thickness.

Furthermore, the lighting device may comprise a grid mask (with a grid or with grid struts) which (optically) delimit the segments from each other. The grid mask is particularly opaque (in the area of its grid or struts). For example, the grid mask can be black. The grid struts or the grid of the grid mask accordingly ensures that the segments are separated from each other in the cold and warm appearance of the lighting device in order to improve the optical perception of the displayable light signatures.

In this case, the grid mask may be formed in particular as a sheet metal, a film, an injection molded part and/or a laser ablation of the optical disk. In particular, a thin sheet, for example with a wall thickness between 0.1 mm and 0.5 mm, can be used as sheet metal, which may be lasered for the generation of openings in the area of the segments. The sheet metal may then be clamped between the optical disk and a housing frame or housing of the lighting device in the assembly or glued to the optical disk or into the housing frame. The film can, for example, be printed or glued. The film or adhesive film may be printed with the grid or the grid struts and glued to the optical disk or clamped between the optical disk and the housing frame in the assembly. In particular, a 2-component molded part can be used as an injection molded part. The grid mask may, for example, be sprayed onto the optics disk as a second, black component. In a laser ablation, for example, the optical disk can be metallized or painted and then lasered out for the open segment surfaces.

The lighting device may further comprise a housing, in particular designed as a housing frame or with a housing frame. The printed circuit board, the reflector element and the optical disk can be accommodated in the housing. Furthermore, the grid mask may be included in the housing. Fasteners, such as screw bosses, may be arranged on the back of the housing.

In addition, it may be provided that the optical disk has optical scattering elements on its front and/or back. As optical scattering elements, for example, pillow optics or micro-optics may be provided or a diffractive diffuser structure or microstructure or, in the simplest case, an erosion structure or etching structure.

According to a second aspect of the invention, the object mentioned above is achieved by a lighting system for a motor vehicle having a lighting device according to the first aspect of the invention and a control unit for controlling a light signature display of the lighting device.

Via the control unit or the electronics, the lighting device can be controlled in particular variably to display a wide variety of contents, for example individual pictograms and signs, such as traffic signs or auxiliary signs in traffic, such as a right arrow, an indicator arrow, an image of a pedestrian or the like. Such content, which can be displayed by means of appropriate illumination by several of the light-emitting diodes or the segments, are here understood to be light signatures. Such light signatures can be static or dynamic, i.e., do not change over time or do change over time.

In particular, the lighting system may comprise a plurality of lighting devices according to the first aspect of the invention. The control unit may be configured to control at least two of the plurality of lighting devices for displaying a common light signature.

A common light signature is understood in the present case in that the light signature of the at least two lighting devices are matched to each other in order to represent the same or a coordinated content by means of the illumination.

According to a third aspect of the invention, the object mentioned above is achieved by a motor vehicle having a lighting device according to the first aspect of the invention or a lighting system according to the second aspect of the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
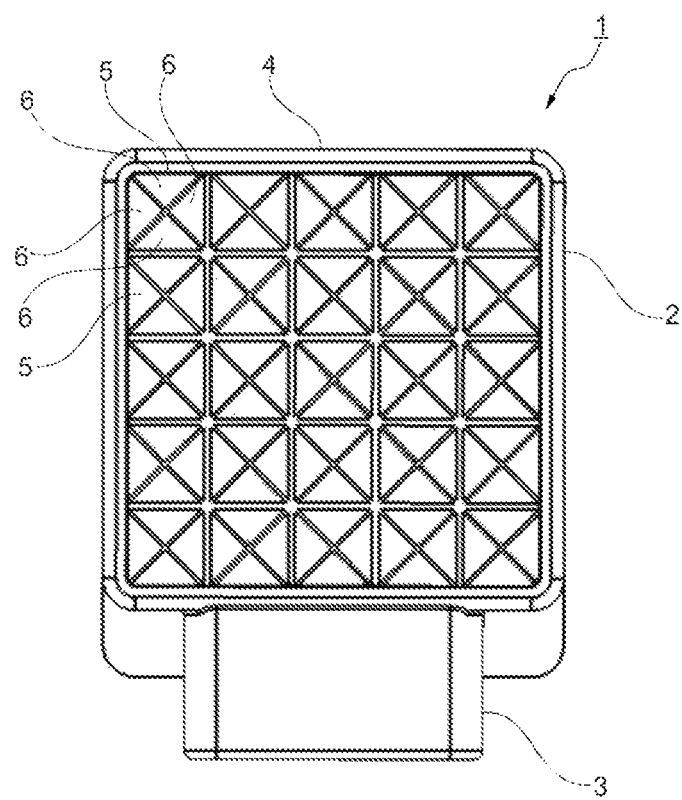
FIG. 1 is a plan view of a lighting device according to an embodiment of the invention.
Figure 2:
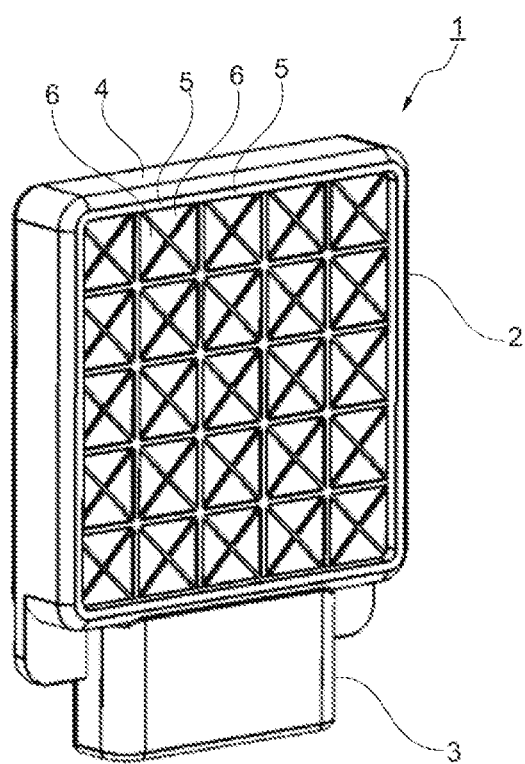
FIG. 2 is an oblique view of the lighting device from FIG. 1.
Figure 3:
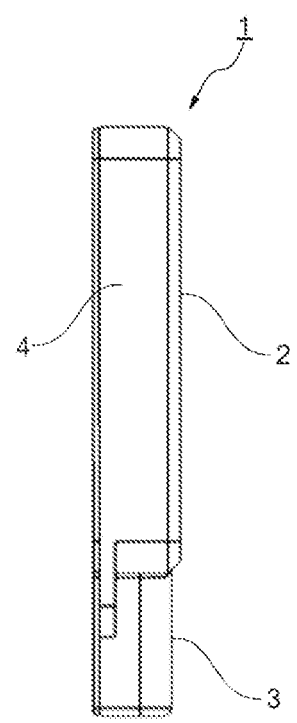
FIG. 3 is a side view of the lighting device from FIG. 1.

FIGS. 1 to 3 each show a lighting device 1 according to an example of the invention in a plan view, a perspective view and a lateral view.

The lighting device 1 comprises a housing 4, which is formed in the present case as a housing frame having an upper part 2 and a lower part 3. The housing 4 has a small thickness as compared to its width and height extension. The housing 4 is in the present case, in particular in the upper part 2, for example, rectangular, in particular square, so that the lighting device 1 has an overall rectangular shape. Alternatively, however, the housing 4 or the lighting device 1 may also have other shapes, such as rectangular, round or oval.

As can be seen from FIG. 1, the lighting device 1 comprises a plurality of arrangements 5, each comprising a plurality of segments 6. In the present case, the arrangements 5 are formed square in their basic shape or appearance on the optical disk 8 (see FIG. 5) of the lighting device 1 and each comprise four triangular segments 6. The individual segments 6 can be illuminated individually and evenly by means of light-emitting diodes 11 (see FIG. 5) arranged behind them.

Figure 4:
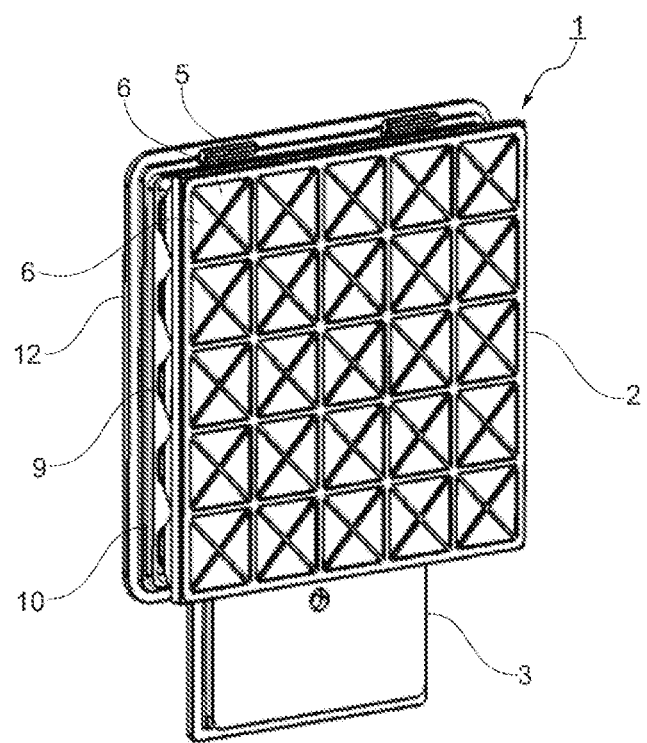
FIG. 4 is an oblique view of the lighting device from FIG. 1 without housing.

FIG. 4 shows in a perspective view of the lighting device 1 without housing 4 that the light-emitting diodes 11 (see FIG. 5) are arranged for this purpose on a circuit board 10 or board 5 and behind a reflector element 9. Behind the circuit board 10, also a rear part 12 of the housing 4 can be seen, which allows for the closing of the housing 4 from the back.

Figure 5:
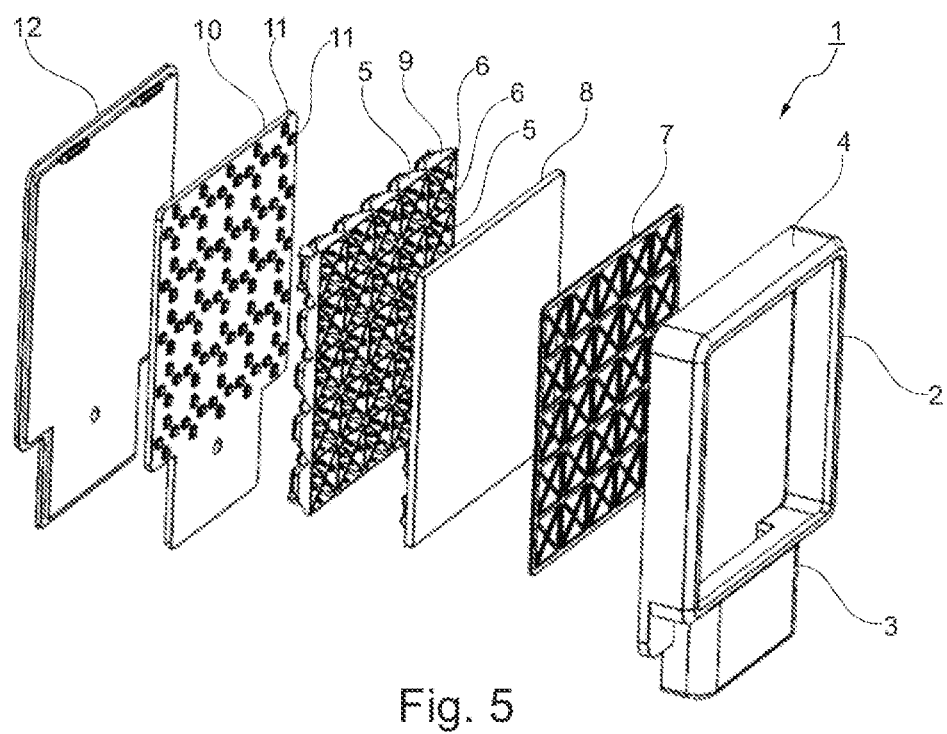
FIG. 5 is an exploded view of the lighting device from FIG. 1.

FIG. 5 shows the lighting device 1 in an exploded view, from which it can be inferred that the reflector element 9 has the segments 6 arranged in the arrangements 5 and the repeating arrangements 5. The reflector element 9 is arranged in the present case in one piece with all arrangements 5 and segments 6. Alternatively, the segments 6 can also be produced individually, but this is more complex.

The reflector element 9 is arranged on the circuit board 10 with the light-emitting diodes 11. In each case, a light-emitting diode 11 is assigned to a segment 6 in the reflector element 9 or each segment 6 surrounds one of the light-emitting diodes 11 on the circuit board 10.

On the reflector element 9, in turn, an optical disk 8, for example made of glass or plastic, is arranged. On the optical disk 8, in turn, a grid mask 7 is arranged, which provides an optical separation of the segments 6 from each other. All of the aforementioned components are included in the housing 4.

Figure 6:
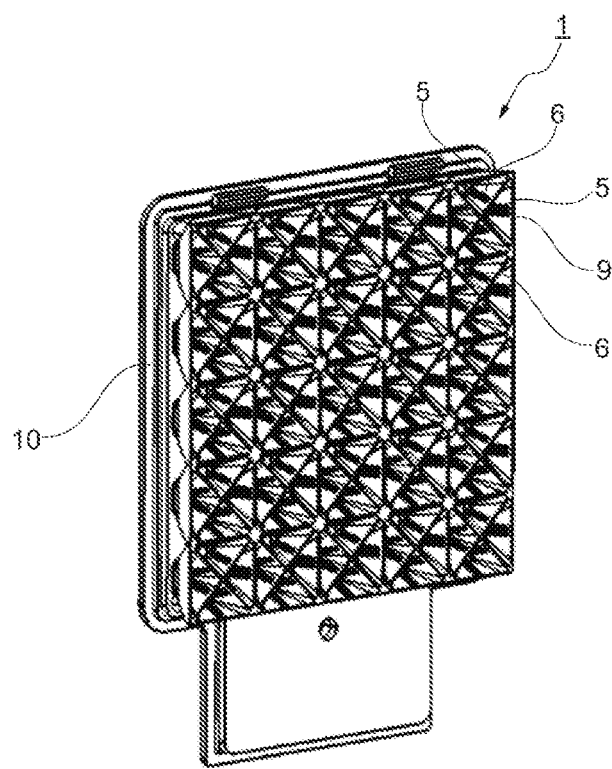
FIG. 6 is an oblique view of the lighting device from FIG. 1 without housing and without grid mask.

FIG. 6 shows an oblique view of the lighting device 1 without housing 4, without optical disk 8 and without grid mask 7. It can be seen here how each light-emitting diode 11 (not directly visible) is arranged within each segment 6 or is surrounded by the segment 6, which can illuminate the light-emitting diode 11.

Figure 7:
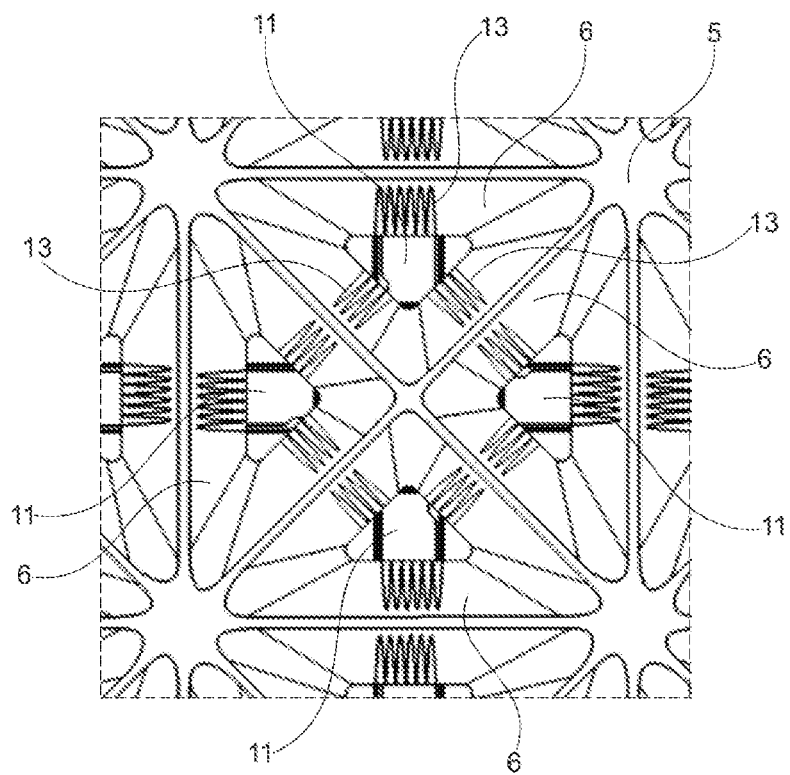
FIG. 7 is a detailed view of an arrangement of the lighting device from FIG. 1.

FIG. 7 shows a detailed view of an arrangement 5 with four triangular segments 6, which are arranged in the square arrangement 5 on the printed circuit board 10. Each of the segments 6 has three mutually angled reflector surfaces or walls, on each of which a striped effect 13 is formed in proximity to the respective light-emitting diode 11 assigned to the segment 6. The corners of the segments 6 are rounded. The segments 6 extend from the respective light-emitting diode 11 in the direction of the optical disk 8 with an opening close to the light-emitting diode 11, which allows for the irradiation of light from the light-emitting diode 11 to the reflector surfaces, to a larger opening, from which the light then exits onto the optical disk 8, through which it then in turn passes through.

Figure 8:
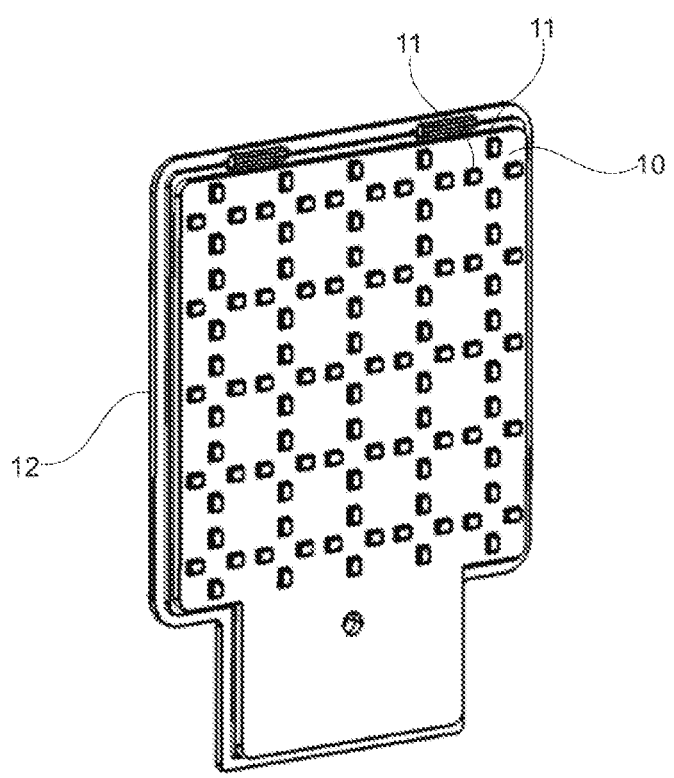
FIG. 8 is an oblique view of the circuit board of the lighting device from FIG. 1.

FIG. 8 shows an oblique view onto the printed circuit board 10 with the LEDs 11. As can be seen, the light-emitting diodes 11 are arranged here in a repeating plus arrangement corresponding to the arrangements 5 on the circuit board 10.

Figure 9:
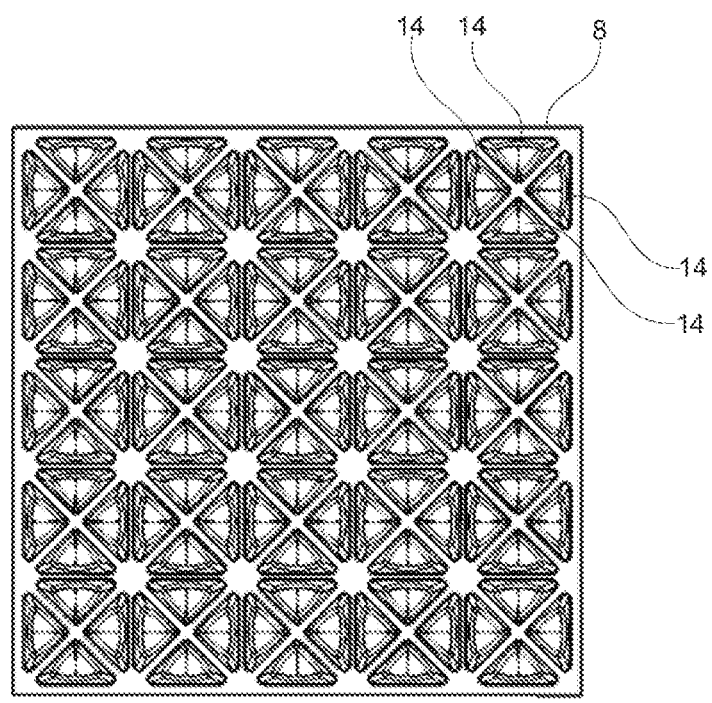
FIG. 9 is a plan view of the back of the optical disk of the lighting device from FIG. 1.

FIG. 9 shows a plan view of the back of the optical disk 8 of the lighting device 1, i.e., the side facing the reflector element 9. Here it can be seen that the optical disk 8 has a plurality of concave lenses 14 formed on its back, each of which is triangular and arranged in accordance with the arrangement 5 of the segments 6 on the optical disk 8, so that each lens 14 is assigned to a segment 6 or located opposite thereto.

Figure 10:
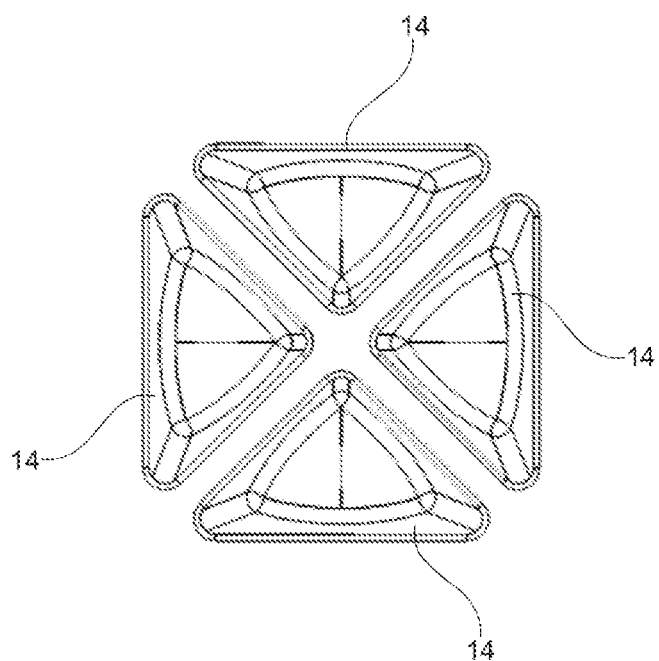
FIG. 10 is a plan view of an arrangement of concave lenses of the optical disk from FIG. 9.
Figure 11:
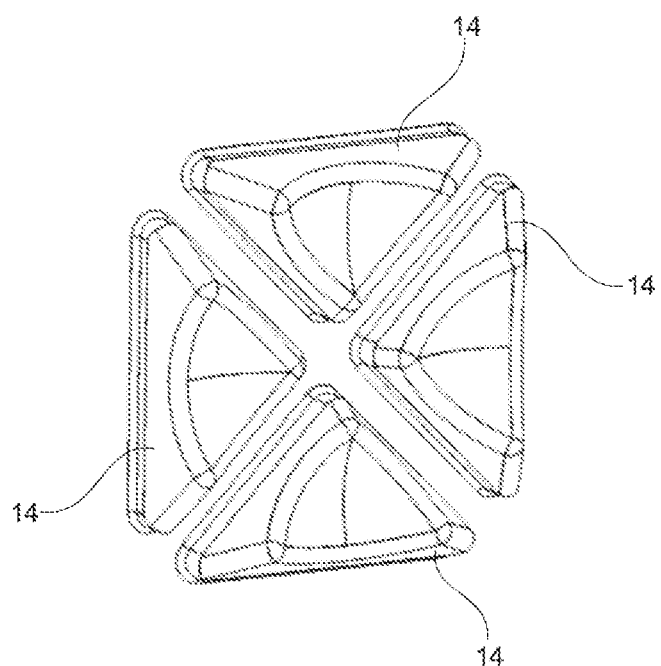
FIG. 11 is an oblique view of the arrangement of the concave lenses from FIG. 10.
Figure 12:
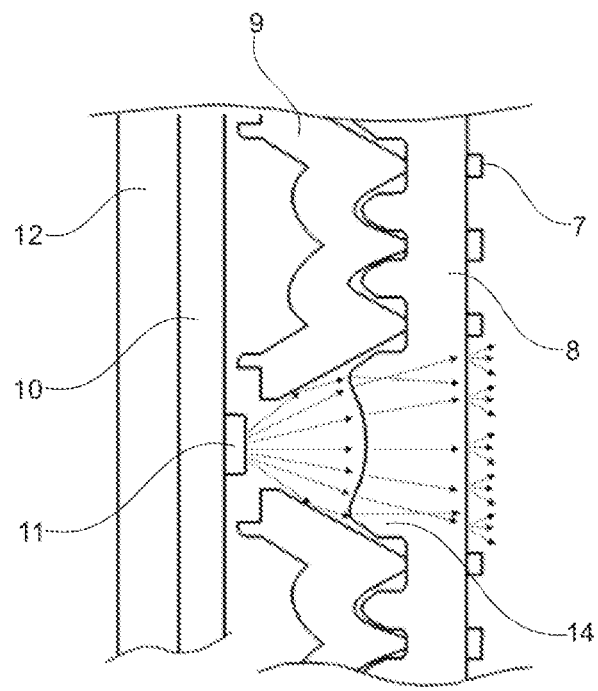
FIG. 12 is a schematic view of a section of the lighting device from FIG. 1 in operation.

FIGS. 10 and 11 show the concave lenses 14 in a plan view and an oblique view in an arrangement with four concave lenses 14. Here it is particularly easy to see that the lenses 14 each have a concave, central surface, which accordingly have a greater distance to the light-emitting diode 11 assigned to it by means of the segment 6. Their shape corresponds to a pyramidal look, so that by comparison the lenses in their outer area have a larger wall thickness. This is advantageous for uniform illumination without emphasizing an axial light-emitting diode intensity (especially with so-called top LEDs) and thus allows for illumination of the segment 6 or the area of the optical disk 8 in front of segment 6 without a hotspot.

FIG. 9 shows a section of the lighting device 1 in a cross-sectional view. An example of a section of a printed circuit board 10 with three light-emitting diodes 11 and wall elements or reflector surfaces of segments 6 of the reflector element 9 can be seen here. Finally, the grid mask 7 is located behind the optical disk 8.

The distance between the light-emitting diodes 11 and the optical disk 8 is particularly small, for example, is only 10 cm or less to achieve the compactness or small thickness of the lighting device 1 mentioned above. Accordingly, there is little space for the corresponding reflector element 9 or corresponding reflections. At the same time, however, the most uniform illumination of the respective segment 6 or area of the optical disk 8 in front of the respective segment 6 must be achieved.

To ensure this, as already explained, the concave lenses 14, which are formed by way of example in one piece with the optical disk 8, are used in the present case. The lenses 14 also include a light guide effect and, in the interaction of the prism surfaces of the lenses 14 and the surrounding reflector surfaces of the segments 6, also an additional light guidance, which together with the central illumination of the concave lens surface leads to a homogeneous illumination of the segment 6.

Figure 13:
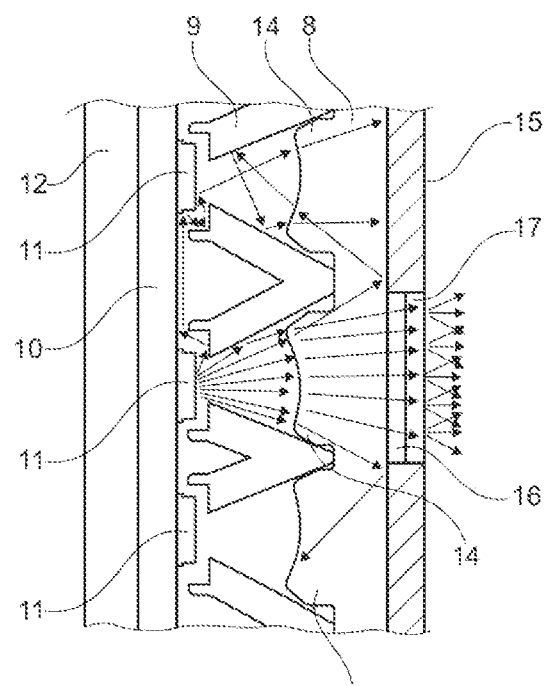
FIG. 13 is the view from FIG. 12 with a solution for avoiding stray light in unlit segments.

Now, as FIG. 13 shows in a further view, it can come to a deflection of light from one segment 6 to another segment 6 between the light-emitting diodes 11 and the reflector element 9 or the segments 6. This can also be referred to as stray light. The problem with this stray light is that segments 6 not actively illuminated by a light-emitting diode assigned to a segment 6 are nonetheless illuminated to a lesser extent. As a result, the desired light signature display of the lighting device 1 is compromised.

In order to solve this problem, a screen 15, in particular a passive LC display, is arranged on the front or visible side of the optical disk 8, which is formed in the present case by way of example from a first thin substrate 15 and a second thin substrate 16 and a liquid crystal in between. The substrates 15, 16 may be, for example, glass panes or plastic films.

Now the screen 15 is, in particular, a so-called dye-doped display, in which the color pigments of the screen 15 are doped. In the non-operating state of the screen 15, the color pigments, which may be, for example, black, determine the color of the screen 15.

The screen 15 is now programmed or control-technically configured with the LEDs 11 or the board 10 so that the screen 15 remains switched off or non-transparent in the region of those segments 6 or opposite of segments 6 to which associated light-emitting diodes 11 are not activated, so that only the predetermined color pigments can be seen, for example, black. As a result, no stray light can be seen from the outside in the non-active segments 6, even if it hits the optical disk 8 there.

Again, the screen 15 is programmed or control-technically configured to switch on opposite those segments 6, which are illuminated by switching on the light-emitting diodes 11, in order to switch the screen 15 to transparent in this area opposite the segment 6, as can be seen in FIG. 13. As a result, the light of the light-emitting diode 11 of this segment 6 can escape from the optical disk 8 or the lighting device 1 and be perceived optically.

Figure 14:
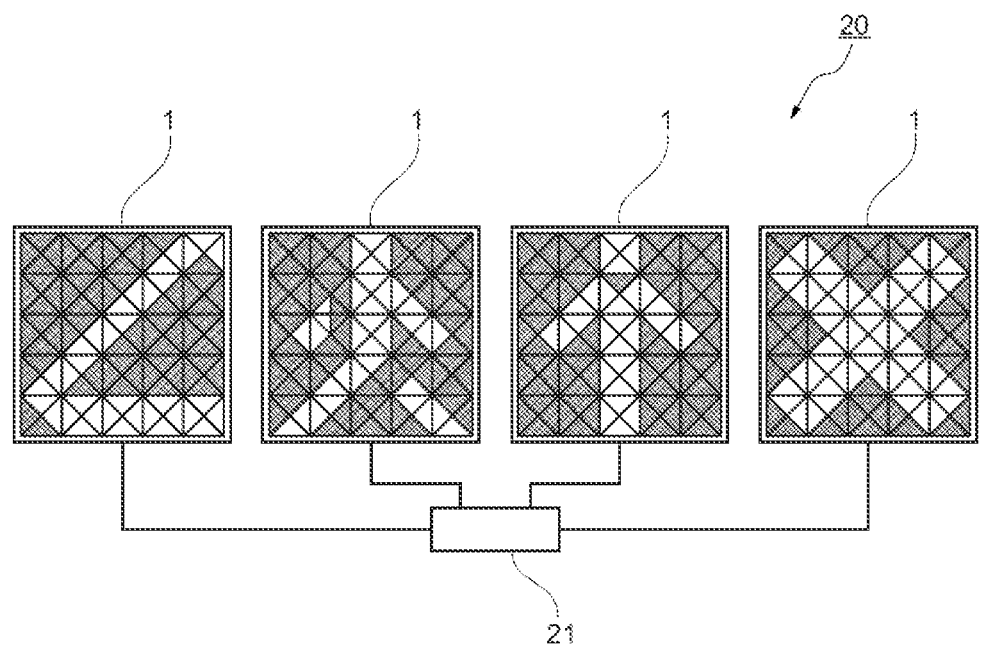
FIG. 14 is a schematic view of a lighting system according to an embodiment of the invention in operation with different light signatures.

FIG. 14 shows schematically a lighting system 20 with several, in the present case purely by way of example four, lighting devices 1. The lighting devices 1 may be controllable by means of individual or, as shown, a common control unit 21.

In FIG. 14, different light signatures are shown, which are displayed by the respective lighting devices 1. Individual contents or symbols are reproduced by means of the light signatures, such as a cross for a stop, a walking pedestrian or a standing pedestrian.

When using light-emitting diodes 11, which cover the color spectrum (yellow, red, blue), a division of the area of a lighting device 1, for example with a larger red area (red light-emitting diodes) and a smaller yellow area (yellow light-emitting diodes) or another color distribution is possible. As a result, two functions, e.g., taillight and direction indicator, or three functions, e.g., tail brake light and direction indicator, can be realized.

Figure 15:
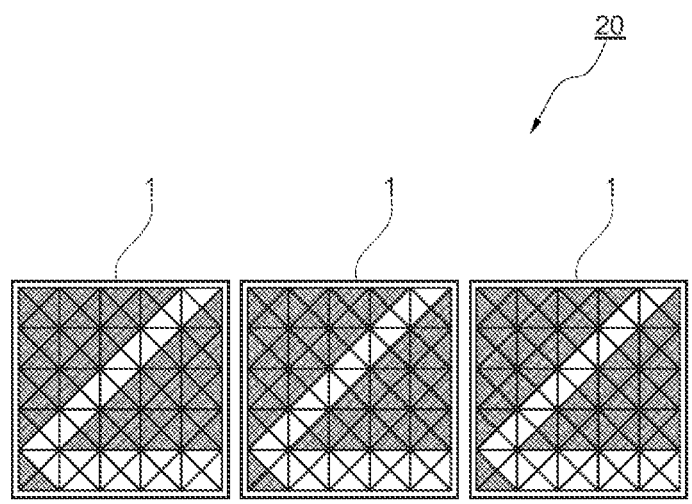
FIG. 15 is a schematic view of a lighting system according to a further embodiment of the invention in operation with a common light signature.

However, it is also possible to match the light signatures of the individual lighting devices 1. For example, FIG. 15 shows three lighting devices 1 of a lighting system 20, each showing the same light signature.

Figure 16:
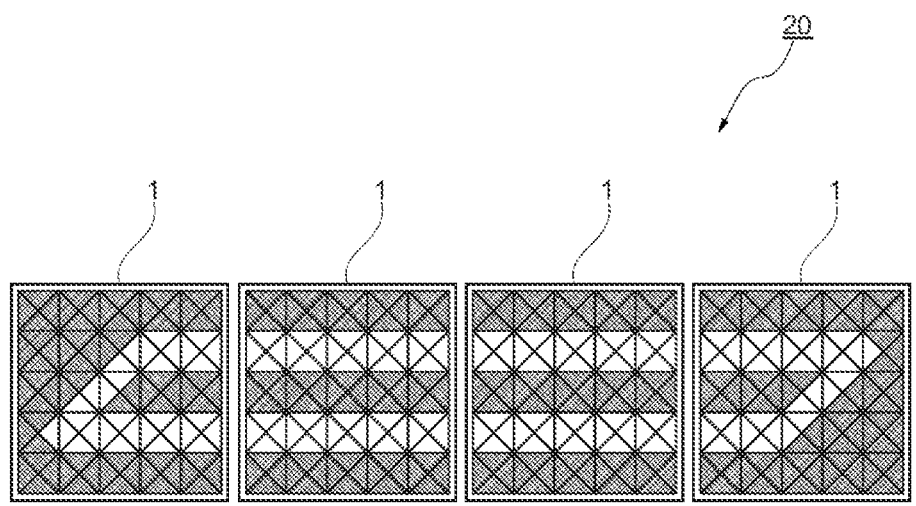
FIG. 16 is a schematic view of the lighting system from FIG. 9 in operation with a common light signature.
Figure 17:
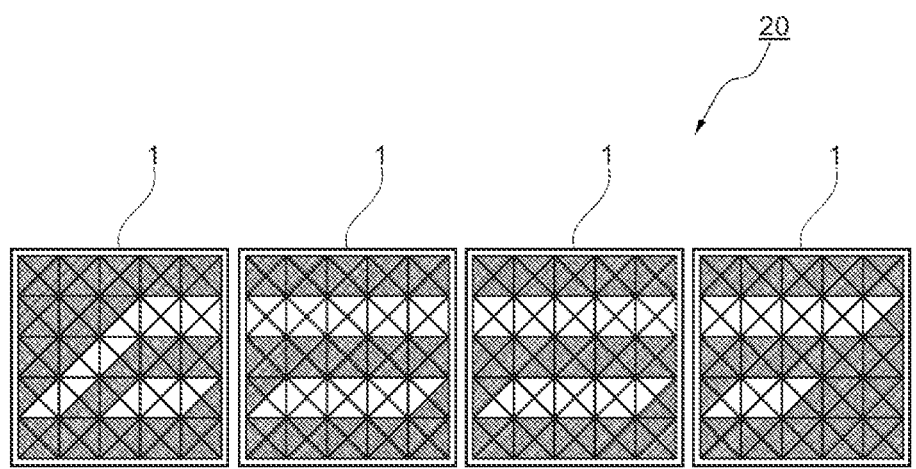
FIG. 17 is a schematic view of the lighting system from FIG. 9 in operation with another common light signature.

FIGS. 16 and 17 each show a different and self-contained or common light signature, which is generated in sequence or series connection of four lighting devices 1 together jointly by the latter.

Figure 18:
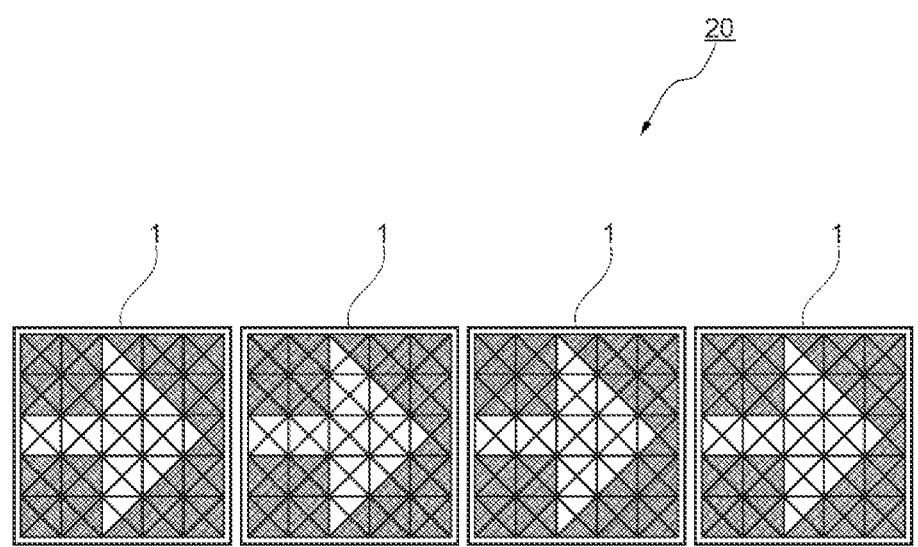
FIG. 18 is a schematic view of the lighting system from FIG. 9 in operation with yet another common light signature.

FIG. 18, in turn, shows a repetition of a light signature on four lighting devices 1 of a lighting system 20, wherein the light signature occupies a usable indication function, for example, in driving of the motor vehicle equipped with the lighting system 20, namely the display of a right arrow, which can also be referred to as a driving indicator and can be used, for example, for driving the motor vehicle 30 equipped with it (see FIG. 14) to the right.

Figure 19:
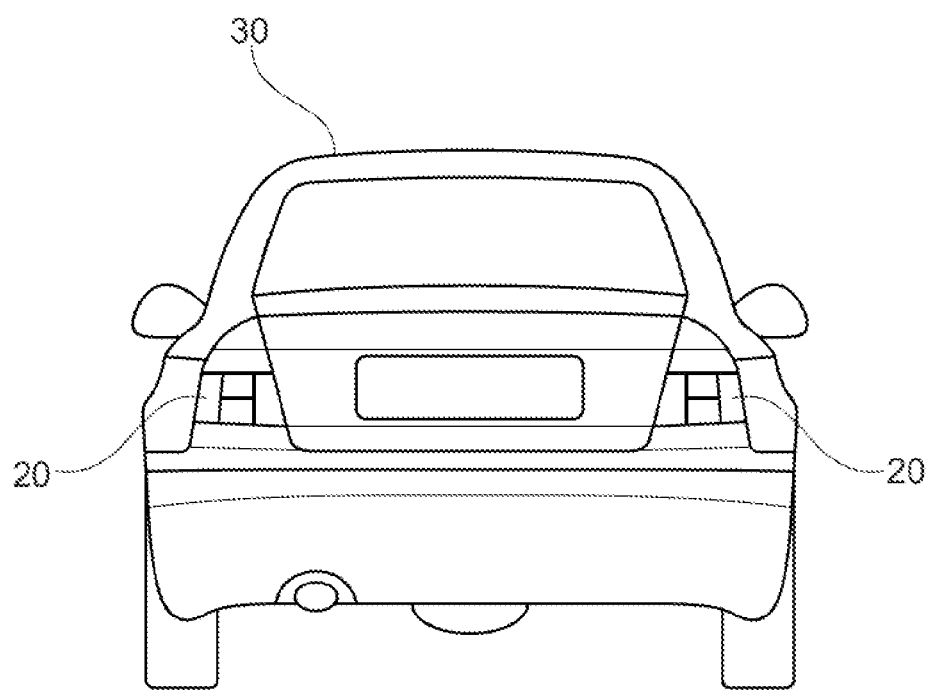
FIG. 19 is a rear view of a motor vehicle according to an embodiment of the invention.

FIG. 19 shows a motor vehicle 30 according to an embodiment of the invention in a rear view. The motor vehicle 30 is each configured with the lighting systems 20 described above, which are configured in the present case as rear lights of the motor vehicle 30 and thus enable the display of various common or different light signatures, for example a turning by means of corresponding arrow representations as light signatures.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting device for a motor vehicle, the lighting device comprising:
a printed circuit board having light-emitting diodes arranged thereon;
an optical disk; a reflector element arranged between the printed circuit board and the optical disk, the reflector element having segments into which the reflector element is divided; and
concave lenses,
wherein each respective one of the light-emitting diodes is assigned to a respective one of the segments so that light radiated from the light-emitting diodes is reflected at the segments of the reflector element and passes through the optical disk,
wherein the segments have a triangular or substantially triangular shape,
wherein each segment of the reflector element is assigned a respective one of the concave lenses,
wherein the concave lenses are arranged between the reflector element and the optical disk,
wherein each of the concave lenses protrude from a surface of the optical disk that faces the light-emitting diodes, such that the concave lenses each protrude in a direction towards the light-emitting diodes, and
wherein a surface of each of the concave lenses, that is positioned closest to the light-emitting diodes, is concave.

2. The lighting device according to claim 1, wherein a multiple of the segments are combined into repeating arrangements, the arrangements being arranged in rows and columns on the reflector element.

3. The lighting device according to claim 2, wherein the arrangements each have a rectangular or substantially rectangular shape.

4. The lighting device according to claim 1, wherein each light-emitting diode is assigned a segment such that light emitted from the light-emitting diode is reflected at the reflector element and passes through the optical disk in the region of the segment assigned to each of the light-emitting diodes.

5. The lighting device according to claim 1, wherein the concave lenses are formed in one piece with the optical disk.

6. The lighting device according to claim 1, wherein the concave lenses have a triangular or substantially triangular shape.

7. The lighting device according to claim 1, wherein at least a part of the segments of the reflector element have striped effect.

8. The lighting device according to claim 1, wherein a distance between the light-emitting diodes and the optical disk is less than 15 mm.

9. The lighting device according to claim 1, wherein the lighting device further comprises a grid mask which delimits the segments from each other.

10. The lighting device according to claim 1, wherein the lighting device further comprises a housing in which the printed circuit board, the reflector element and the optical disk are accommodated.

11. The lighting device according to claim 1, wherein the optical disk has optical scattering elements on a front and/or a back of the optical disk.

12. A lighting system for a motor vehicle comprising the lighting device according to claim 1 and a control unit to control a light signature display of the lighting device.

13. The lighting system according to claim 12, wherein the lighting system comprises a plurality of the lighting device and the control unit is configured to control at least two of the plurality of the lighting device for displaying a common light signature.

14. A motor vehicle comprising the lighting device according to claim 1.

15. The lighting device according to claim 1, wherein a base of each of the concave lenses is wider than the surface that is concave.

16. The lighting device according to claim 1, wherein the segments have rounded corners.

17. The lighting device according to claim 9, wherein the grid mask is provided on a surface of the optical disk that faces away from the light-emitting diodes.

* * * * *